United States Patent
Ågren

(10) Patent No.: US 8,100,432 B2
(45) Date of Patent: Jan. 24, 2012

(54) AIR-BAG WITH GAS DEFLECTOR

(75) Inventor: Tomas Ågren, Kode (SE)

(73) Assignee: Autoliv Development AB, Vargarda (SE)

( * ) Notice: Subject to any disclaimer, the term of this patent is extended or adjusted under 35 U.S.C. 154(b) by 0 days.

(21) Appl. No.: 12/597,063

(22) PCT Filed: Apr. 23, 2007

(86) PCT No.: PCT/SE2007/000385
§ 371 (c)(1),
(2), (4) Date: Nov. 4, 2009

(87) PCT Pub. No.: WO2008/130287
PCT Pub. Date: Oct. 30, 2008

(65) Prior Publication Data
US 2010/0133792 A1    Jun. 3, 2010

(51) Int. Cl.
*B60R 21/239* (2006.01)
*B60R 21/2346* (2011.01)

(52) U.S. Cl. ........ 280/729; 280/736; 280/740; 280/742; 280/743.1

(58) Field of Classification Search ............. 280/736, 280/743.1, 729, 740, 742, 743.2
See application file for complete search history.

(56) References Cited

U.S. PATENT DOCUMENTS

| | | | |
|---|---|---|---|
| 5,573,270 A * | 11/1996 | Sogi et al. ............... | 280/740 |
| 5,697,641 A * | 12/1997 | McGee et al. ........... | 280/743.1 |
| 5,913,535 A | 6/1999 | Taguchi et al. | |
| 5,951,038 A * | 9/1999 | Taguchi et al. .......... | 280/729 |
| 6,050,600 A * | 4/2000 | Yoshida .................. | 280/740 |
| 6,086,092 A * | 7/2000 | Hill ....................... | 280/729 |
| 6,247,727 B1 * | 6/2001 | Hamada et al. .......... | 280/743.2 |
| 6,382,662 B1 | 5/2002 | Igawa | |
| 6,585,290 B2 * | 7/2003 | Pinsenschaum et al. .. | 280/740 |
| 6,612,609 B1 * | 9/2003 | Rodriguez et al. ....... | 280/729 |
| 6,834,884 B2 | 12/2004 | Gu | |
| 7,150,470 B2 * | 12/2006 | Okada et al. ............. | 280/743.1 |
| 7,195,279 B2 * | 3/2007 | Rose et al. ............... | 280/740 |
| 7,303,207 B2 * | 12/2007 | Asai et al. ............... | 280/738 |
| 7,648,166 B2 * | 1/2010 | Maripudi ................ | 280/740 |
| 7,686,327 B2 * | 3/2010 | Heuschmid et al. ...... | 280/729 |
| 7,748,739 B2 * | 7/2010 | Brinker .................. | 280/742 |
| 2001/0007391 A1 | 7/2001 | Hamada et al. | |
| 2003/0107205 A1 | 6/2003 | Gu | |
| 2003/0222434 A1 | 12/2003 | Okada et al. | |
| 2011/0101663 A1 * | 5/2011 | Schneider ............... | 280/743.1 |

FOREIGN PATENT DOCUMENTS

EP          1318052 A1      6/2003

* cited by examiner

*Primary Examiner* — Paul N Dickson
*Assistant Examiner* — James English
(74) *Attorney, Agent, or Firm* — Harness, Dickey & Pierce, P.L.C.

(57) ABSTRACT

A safety airbag arrangement for a vehicle comprises a main airbag having an inlet for connection with an inflator and a gas deflector bag secured within the main airbag, having an inlet in register with the inlet of the main airbag, for connection with the inflator, the gas deflector bag having ventilator holes and the arrangement being such that gas supplied to the airbag arrangement via the inlets by the inflator must first pass into the gas deflector bag, to pass subsequently from the gas deflector bag through the ventilation holes. The wall of the gas deflector bag is secured to the main wall of the main airbag by a plurality of arcuate seams spaced progressively from inlets, to maintain the gas deflector bag in a predetermined position relative to the main airbag when the airbag arrangement is activated.

19 Claims, 4 Drawing Sheets

Figure 1A:
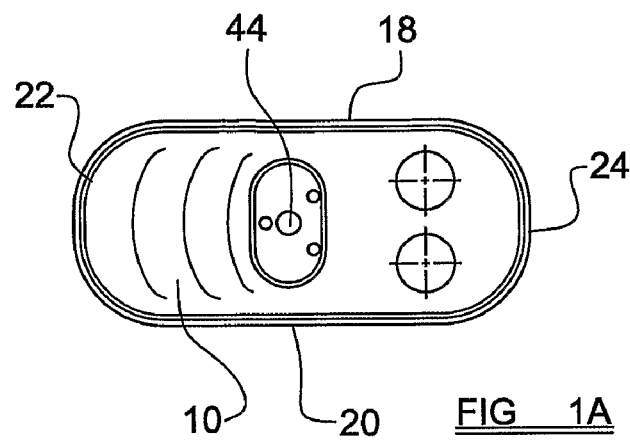

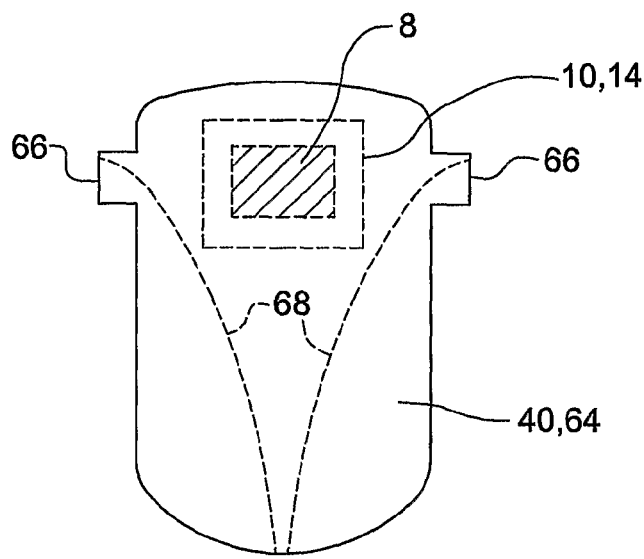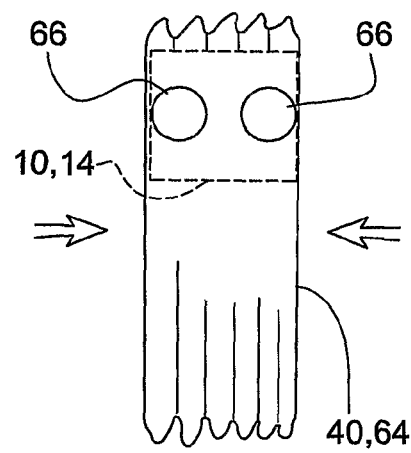
FIG 6  FIG 7
FIG 8 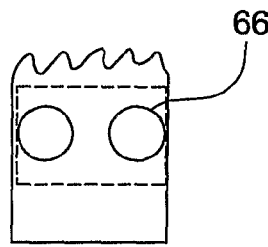 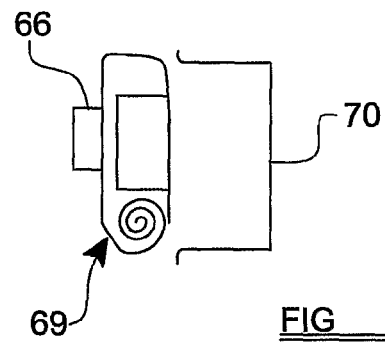 FIG 9

US 8,100,432 B2

AIR-BAG WITH GAS DEFLECTOR

CROSS-REFERENCE TO RELATED APPLICATIONS

This application is a 371 U.S. National Stage of International Application No. PCT/SE2007/000385, filed Apr. 23, 2007, the disclosure of which is incorporated herein by reference.

DESCRIPTION OF INVENTION

THIS INVENTION relates to so-called air-bags of the kind used to protect occupants of motor vehicles from injury in crash situations. Such an air-bag is inflated rapidly in a crash situation by means of a pyrotechnic gas generator, herein termed an inflator, capable of inflating the air-bag in a fraction of a second from a stowed condition, behind a displaceable interior panel of the vehicle, to a fully inflated condition in front of the vehicle occupant for which it is intended. It is known, in such an air-bag, to provide a gas deflector, in the form of a fabric bag with vent holes, which bag is located on the gas outlet from the inflator, so that the gas from the inflator first enters the gas deflector bag before passing from the gas deflector to the main air-bag through the vent holes in the gas deflector. The function of the gas deflector is mainly to spread the gas from the inflator in preferred directions into the main air-bag but the gas deflector may also function to capture debris from the inflator.

In known air-bags with such gas deflectors, a problem has arisen in that the behaviour of the air-bag during deployment is less predictable than is desirable.

It is an object of the present invention to provide an improved air-bag with a gas deflector therein and which has more predictable behaviour during deployment than known air-bags of this type.

The applicants have discovered that much of the unpredictability of the behaviour of known air-bags incorporating internal gas deflectors arises from the fact that when the air-bag is folded up to be stowed in the receptacle which contains it until deployment, the position adopted by the gas deflector bag that is in the air-bag and which gas deflector is, of course, inaccessible during such folding, may vary significantly from one stowed air-bag to another and from the fact that during inflation of the air-bag, the gas deflector bag may move within the air-bag in a substantially random manner under the action of the inflator gases passing through it.

According to the present invention there is provided an airbag arrangement for protecting a vehicle occupant in the event of a crash, the airbag arrangement comprising a main airbag having an inlet for connection with an inflator, a gas deflector bag secured within the airbag, having an inlet in register with said inlet of the main airbag, for connection with such air inflator, the gas deflector bag having ventilation holes and the arrangement being such that gas supplied to the airbag arrangement via said inlets by such inflator must first pass into the gas deflector bag, to pass subsequently from the gas deflector bag through said ventilation holes in the gas deflector bag, into the interior of the main airbag, characterised in that the gas deflector bag has a wall thereof in which said inlet is provided secured to a wall of the main airbag at at least one location spaced from said inlet, to maintain the gas deflector bag in a predetermined position relative to the main airbag when the airbag arrangement is activated in an accident situation.

Preferably the gas deflector bag comprises a main panel provided with said inlet in the gas deflector bag, said main panel being secured to a panel of the main airbag provided with said inlet of the main airbag, to be coextensive with said panel of the main airbag over a substantial part of said main gas deflector panel, by a plurality of seams lying to one side of said inlets, at progressively greater distances from said inlets, said seams extending generally transversely to a notional line along which said inlets and said seams are spaced apart.

Preferably each of said seams is arcuate and concave toward said inlets.

The invention also comprehends such an airbag arrangement including an inflator and, connected with the airbag via said inlet, a housing holding the airbag and gas deflector in a folded, stowed condition, the position of the airbag within the housing; the manner in which the airbag is packed; and the configuration of the housing being such that, when the inflator is activated, the initial inflation of the gas deflector bag within the main airbag defines a space between the gas deflector bag and a wall of the housing in which the major part of main airbag is contained, said space narrowing towards an exit from the housing to form a nip region between an edge portion at a mouth of the housing and the airbag part supported by the inflated gas deflector bag, whereby, in order to inflate fully, the major part of the main airbag must pass through said nip region so that the latter exerts a restraining force controlling deployment of the main bag.

Figure 1B:
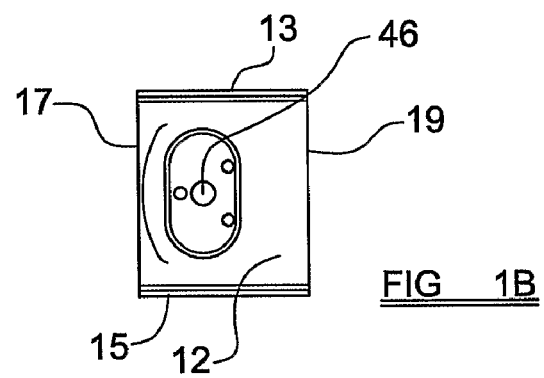
Figure 1C:
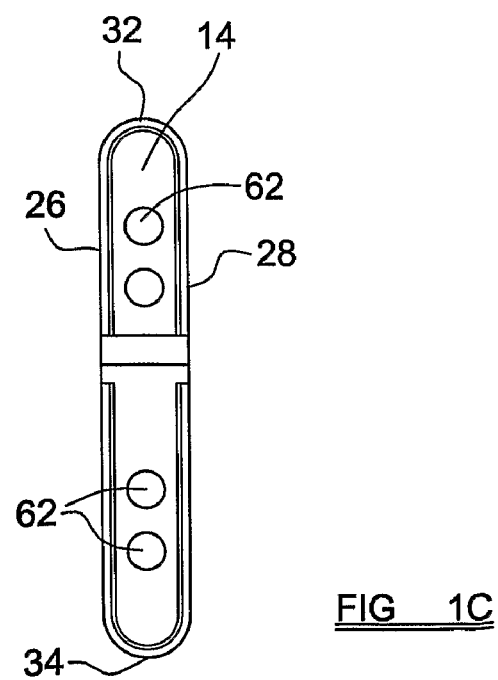
Figure 2:
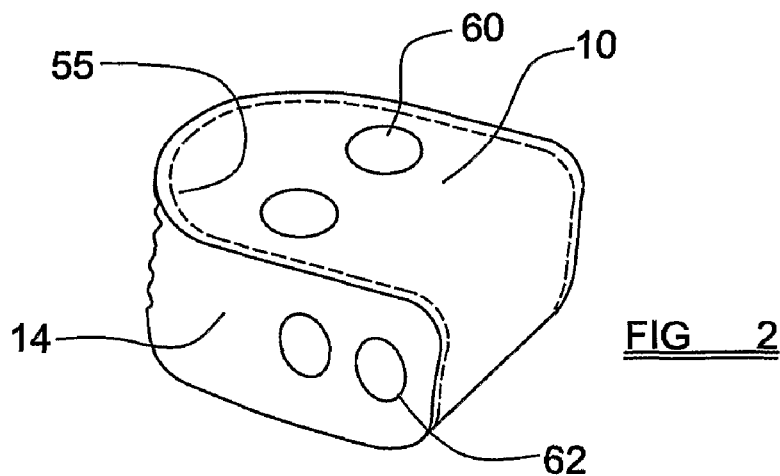
Figure 3:
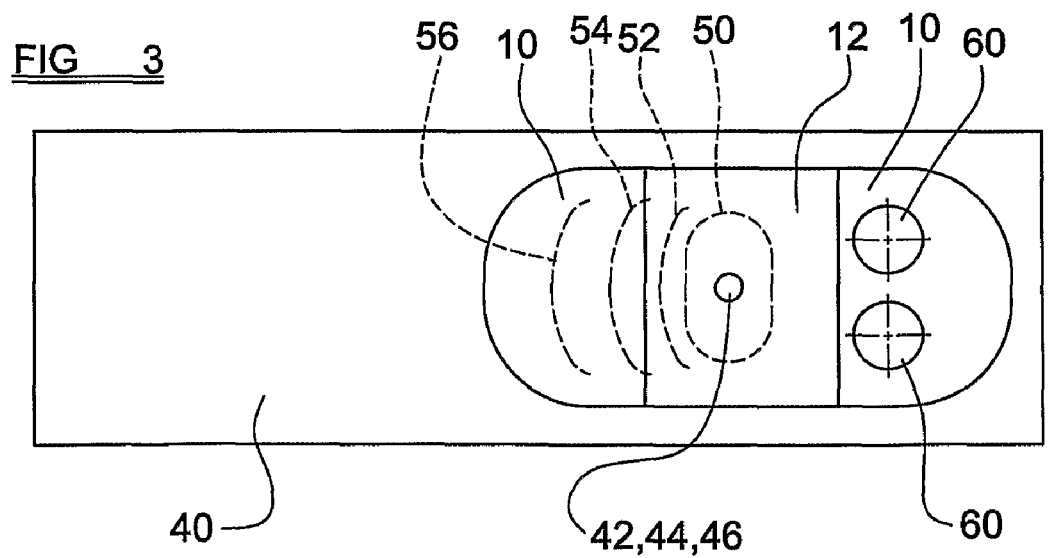
Figure 4:
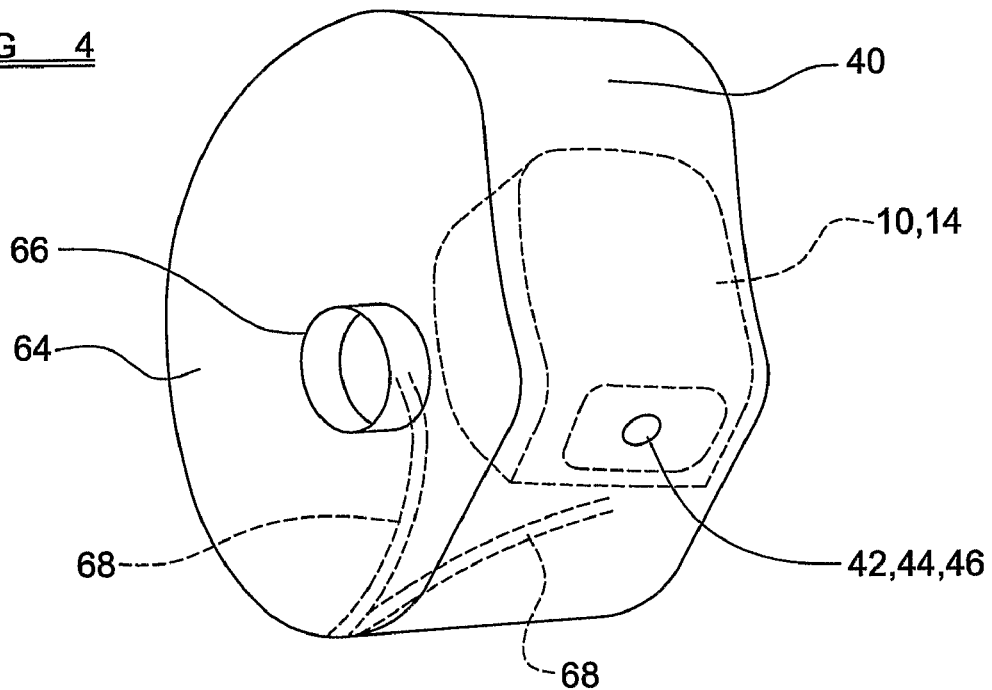
Figure 5:
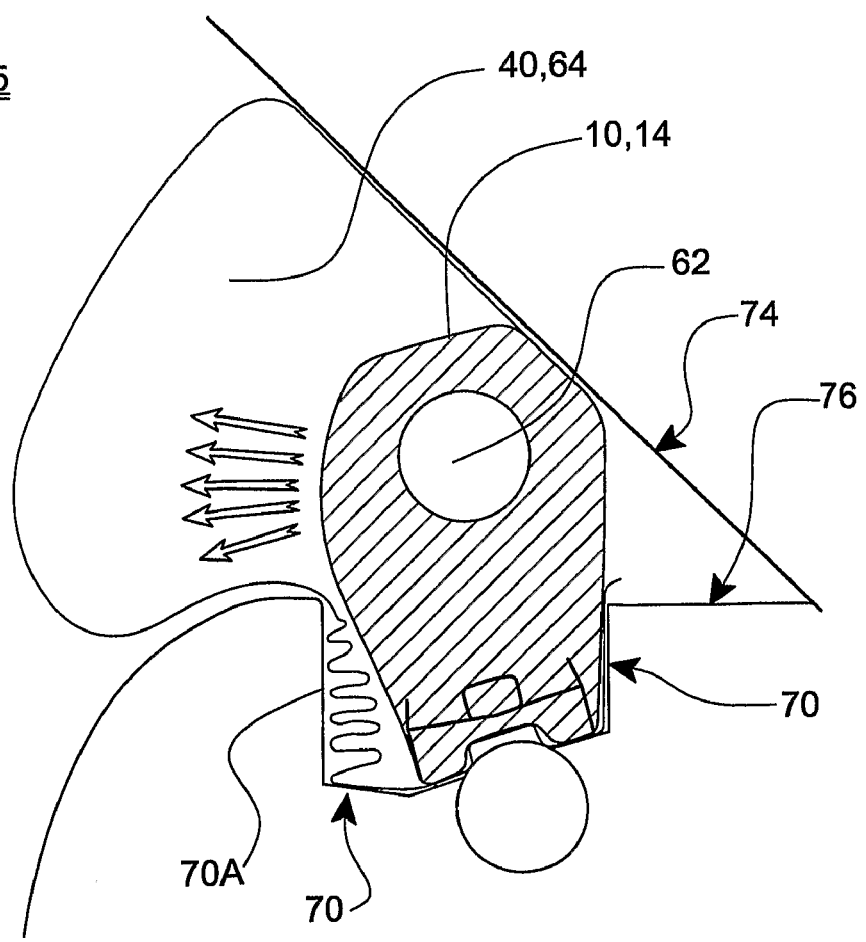
Figure 10:
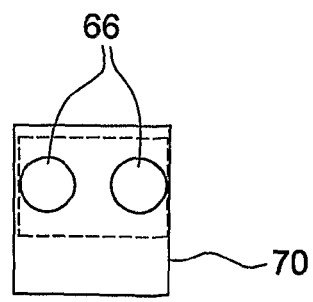

An embodiment of the invention is described below by way of example with reference to the accompanying drawings in which:

FIG. 1 shows, at A, B and C laid out flat, three fabric panels which make up the gas deflector bag, in an air bag arrangement according to the invention, FIG. 2 is a perspective view showing the panels of FIG. 1 connected to form the deflector bag, FIG. 3 is a plan view illustrating a stage in the assembly of the gas deflector bag and the main air bag, FIG. 4 is a perspective view, partially in broken lines, showing the deflector bag within the main air-bag in the deployed condition of the latter, FIG. 5 is a schematic sectional view, taken in the vertical longitudinal plane of a vehicle fitted with the air-bag, illustrating the deployment of the air-bag, and, FIGS. 6 to 10 show successive stages in the packing of the main air bag with the internal gas deflector bag.

Referring to the drawings, FIG. 1 shows at A, a main panel 10 of a fabric deflector bag to be incorporated in an air-bag embodying the invention; shows at B a fabric reinforcing panel 12 of the deflector bag; and shows at C a side panel 14 of the bag.

As shown, the main panel comprises two opposite generally straight parallel side edges 18, 20 joined by arcuate edges 22, 24 at opposite ends of the panel as viewed in FIG. 1. Likewise the side panel 14 comprises two opposite generally straight parallel side edges 26, 28 joined by arcuate edges 32, 34 at opposite ends of the side panel as viewed in FIG. 1. The spacing between the straight edges 26, 28 of the side panel is, in the arrangement shown, somewhat less than the spacing between the straight edges 18, 20 of the main panel, but the peripheral (circumferential) lengths of the main panel 10 and the side panel 14 are substantially equal. In the finished deflector bag, (see FIG. 2), the peripheral edge 18, 20, 22, 24 of the main panel is secured to that of the side panel with both panels extending in generally U-shape, with the opposite arcuate ends 22, 24 of the main panel 10 being secured to respective sides 26, 28 of the side panel 14 in the middle of the sides 26, 28 and with the opposite arcuate ends 32, 34 of the side panel 14 being secured to respective sides 18, 20 of the main panel in the middle of these sides 18, 20. More correctly, the main (10) and side (14) panels are secured together by a seam 55 spaced slightly inwardly of the side edges referred to. The reinforcing panel 12 may be, as shown, generally rectangular, with opposing parallel side edges 13,15, and end edges 17,19, the width of the reinforcing panel, measured between the edges 13,15, being the same as the width of the panel 10, but the length of panel 12, measured between the edges 17,19, being significantly less than the length of the panel 10.

In practice, and referring to FIG. 3, the sequence of assembly is as follows. The panel 12 is superimposed on the main panel 10 with the edges 13,15 superimposed on the edges 18,20 and with a central opening 46 in the reinforcing panel 12 in register with an opening 44 in the main panel 10. The reinforcing panel 12 can be connected with the main panel 10 by respective stitching seams adjacent the superimposed edges 13,18 and 15,20.

A piece of fabric which is to form a main panel 40 of the main air-bag having an inlet opening 42 is laid flat, The main panel 10 of the deflector bag, with the reinforcing panel 12, is laid on top of panel 40 in a predetermined position, with the side edges 18,20, of the panel 10 lying parallel with longitudinal edges of the main panel 40 and with opening 44 in said panel 10 and opening 46 in panel 12 aligned with and registering with said opening 42 in the main panel. The superimposed fabric panels 10, 12, and 40 are then stitched together by a first seam 50 encircling the registering openings 42, 44, 46 in the panels, the reinforcing panel 12 and panel 10 being additionally stitched to the panel 40 by a further arcuate seam 52 located on one side of the encircling seam 50. The main deflector bag panel 10 and the main air-bag panel 40 are further stitched together along further spaced apart seams 54 and 56 on the same side of the registering openings 42, 44, 48, already referred to as the first arcuate seam 52, so that one half of the main deflector bag panel 10 is secured, over an extended area, to the main air-bag panel 40. The seams 52, 54, 56 are all concave towards the openings 42, 44, 46.

The side panel 14 and the main deflector bag panel 10 are then sewn together along their peripheral edges as described above, by seam 55, that half of the deflector bag main panel 10 which is not directly stitched to the main air-bag panel 40 by seams 52, 54 and 56 thus overlying the half which is stitched to the main air-bag panel, with the side panel 14, now extending in a U-shape configuration, connecting the two halves of the main deflector air-bag panel 10, (now also extending in a U-shaped configuration), as shown in FIG. 2. The attachment seams 52, 54, 56 securing the deflector main panel 10 to the air-bag main panel 40 are arcuate in shape so as to avoid sewing directly in the warp or weft directions of the air-bag fabric. The arcuately curved nature of the seams ensures a stronger connection of the deflector air-bag to the main air-bag. Three seams, as illustrated, are preferred, but it would be possible to use only a single arcuate seam positioned at some distance from the inflator, e.g. at the location of the seam 56, to ensure proper positioning of the deflector bag.

It will be noted that the half of the main deflector panel 10 which is not directly stitched to the main air-bag panel 40 is provided with vent holes 60, whilst the side panel 14 is also provided with vent holes 62 in the locations indicated.

After the deflector bag has been stitched together and stitched to the main panel 40 of the main air-bag as described above, the main air-bag is completed by stitching the main panel 40 of the main air-bag to itself and to side panels 64 (see FIG. 4) in a manner known per se. As illustrated, the main air-bag has vent holes 66 (so-called safety-vents or cinch-tube vents) adapted to be closed by tether straps 68 attached to the front portion of the air-bag at one end and extending around the vent holes 66 at their other ends.

The tether straps can be provided outside the air-bag, or alternatively can be provided inside the air-bag.

FIGS. 6 to 10 illustrate schematically the folding of the main air-bag, with the deflector bag inside and secured to the inflator. Thus, FIG. 6 shows the air-bag spread out flat, the position of the deflector bag being illustrated in broken lines, and the position of the inflator 8, (behind the air-bag in the FIG. 6 view), likewise being indicated in broken lines.

In a first stage of folding, the portions of the air-bag which lie to the left and right in FIG. 6, including the safety vents 66 in the form of cinch-tubes, are folded over to lie over the central portion as shown in FIG. 7, so that the two vents 66 lie on the opposite side of the assembly from the inflator 8 and lie adjacent one another. The portion of the air-bag extending below the location of the deflector bag 10, 14 in FIG. 7 is then rolled up or scrunched up as shown in elevation in FIG. 8 and in schematic sectional side view in FIG. 9 in which the rolled portion is indicated at 69, (or is folded up concertina fashion as shown in FIG. 5), to present a compact package (see FIG. 10) which, with the deflector, is mounted in a receptacle or housing 70 in which the assembly will be contained until the air bag is deployed, the housing being closed, in the usual manner, by an overlying detachable internal panel of the vehicle.

FIG. 5 shows part of a vehicle in front of the front-seat passenger's position, and in which the air bag is mounted, until deployed, within its housing 70 in or below the dashboard 76 of the vehicle below the lower, forward edge of the windscreen 74 of the vehicle.

Referring to FIG. 5, the configuration of the housing or receptacle 70 is preferably such that, with the deflector bag 10,14 fully inflated within the still inflating main bag 40,64, the rolled or folded portion of the main bag, corresponding to the region below the indicated location of the deflector bag 10, 14 in FIGS. 6 and 7, is contained within a region of the housing interior bounded on one side by a side wall 70A of housing 70 (preferably the side wall remote from the vehicle windscreen 74 in the arrangement illustrated in FIG. 4), and bounded on the opposite side by the adjacent wall of the inflated deflector bag, (or, depending upon how the main bag is folded or rolled up, by an unfolded or unrolled part of the wall of the main bag, supported by the adjacent wall of the inflated deflector bag), and which region tapers to a narrow region or nip, at the exit from the housing, at which the deflector bag 10,14 exerts a clamping force against the upper edge of wall 70A such that the part of the air-bag which is the lower part in FIGS. 6 and 7 is drawn out of the housing 70 through said narrow region or nip under some restraint, as the main air-bag inflates, providing good deployment and positioning behaviour and avoiding or minimising bag slack. The clamping and restraining effect referred to above may remove or reduce the necessity for complex folding and/or tear seams or straps to achieve satisfactory behaviour of the air-bag. However, tear seams may be used additionally to ensure an orderly unfolding of the air-bag as it inflates.

When used in this specification and claims, the terms "comprises" and "comprising" and variations thereof mean that the specified features, steps or integers are included. The terms are not to be interpreted to exclude the presence of other features, steps or components.

The features disclosed in the foregoing description, or the following claims, or the accompanying drawings, expressed in their specific forms or in terms of a means for performing the disclosed function, or a method or process for attaining the disclosed result, as appropriate, may separately, or in any combination of such features, be utilised for realising the invention in diverse forms thereof.

The invention claimed is:

1. An airbag arrangement for a vehicle comprising:
a main airbag having a first inlet for connection with an inflator; and
a gas deflector bag disposed within the main airbag having a second inlet in register with the first inlet of the main airbag, for connection with the inflator, the gas deflector bag having ventilation holes and the arrangement being such that gas supplied to the airbag arrangement via the first and second inlets by the inflator must first pass into the gas deflector bag, to pass subsequently from the gas deflector bag through the ventilation holes in the gas deflector bag, into an interior of the main airbag;
the gas deflector bag having a deflector bag panel in which the second inlet is provided, the deflector bag panel having a U-shaped configuration with first and second legs and a base when the airbag arrangement is inflated, the base being generally perpendicular to at least one of the legs, the deflector bag panel secured to a main airbag panel at least one location spaced from the first inlet to maintain the gas deflector bag in a predetermined position relative to the main airbag when the airbag arrangement is inflated;
wherein the main airbag panel is secured to the first leg and the base of the deflector bag panel and the second leg of the deflector bag panel is spaced from the main airbag panel.

2. The airbag arrangement according to claim 1, wherein each of the seams is arcuate and concave toward the first and second inlets.

3. The airbag arrangement according to claim 1, further including a housing holding the main airbag and gas deflector bag in a folded, stowed condition, the position of the main airbag within the housing, the manner in which the main airbag is packed and the configuration of the housing being such that when the inflator is activated, the initial inflation of the gas deflector bag within the main airbag defines a space between the gas deflector bag and a wall of the housing in which the major part of main airbag is stowed, the space narrowing towards an exit from the housing to form a nip region between an edge portion of a mouth of the housing and the inflated gas deflector bag, whereby, in order to inflate fully, the major part of the main airbag must pass through the nip region whereby the nip region exerts a restraining force controlling deployment of the main airbag.

4. The airbag arrangement according to claim 1, wherein the seams of the plurality of seams are at progressively greater distances from the first and second inlets.

5. The airbag arrangement according to claim 1, wherein the seams extend generally transverse to a notional line along with the first and second inlets and the seams are spaced apart.

6. The airbag arrangement according to claim 1, wherein the plurality of seams are asymmetrical relative to the first and second inlets.

7. The airbag arrangement according to claim 1, wherein the deflector bag panel defines three sides of the deflector bag and wherein upon inflation of the main airbag and gas deflector bag, first and second sides are secured to the main airbag panel and a third side is spaced from the main airbag panel.

8. The airbag arrangement according to claim 1, wherein the deflector bag panel is asymmetrically secured to the main airbag panel relative to the first and second inlets.

9. The airbag arrangement according to claim 1, wherein the first leg and the base are flush with the main airbag panel.

10. An airbag arrangement for a vehicle comprising:
a main airbag with a main airbag panel having a first inlet for connection with an inflator; and
a gas deflector bag disposed within the main airbag, the gas deflector bag having a gas deflector panel with a second inlet in register with the first inlet of the main airbag, the first and second inlets for connection with the inflator, the gas deflector bag having ventilation holes and the arrangement being such that gas supplied to the airbag arrangement via the first and second inlets by the inflator must first pass into the gas deflector bag, to pass subsequently from the gas deflector bag through the ventilation holes in the gas deflector bag, into an interior of the main airbag, the gas deflector panel being generally U-shaped in configuration upon inflation of the airbag arrangement such that the gas deflector panel includes first and second legs interconnected by a base, the first leg and the base secured to a main airbag panel, the second leg spaced from the main airbag panel.

11. The airbag arrangement according to claim 10, wherein the first side of the gas deflector panel is secured to the main airbag panel with a first seam encircling the first and second inlets.

12. The airbag arrangement according to claim 10, wherein the second side is secured to the main airbag panel by a plurality of second seams.

13. The airbag arrangement according to claim 12, wherein the seams of the plurality of second seams are at progressively greater distances from the first and second inlets.

14. The airbag arrangement according to claim 10, wherein the deflector bag panel is asymmetrically secured to the main airbag panel relative to the first and second inlets.

15. The airbag arrangement according to claim 10, wherein the first and third sides of the gas deflector panel are generally parallel to one another upon inflation.

16. The airbag arrangement according to claim 10, wherein the first leg and the base are flush with the main airbag panel.

17. An airbag arrangement for a vehicle comprising:
a main airbag with a main airbag panel having a first inlet for connection with an inflator; and
a gas deflector bag disposed within the main airbag, the gas deflector bag having a first gas deflector panel with a second inlet in register with the first inlet of the main airbag, the first and second inlets for connection with an air inflator, the gas deflector bag having ventilation holes and the arrangement being such that gas supplied to the airbag arrangement via the first and second inlets by the inflator must first pass into the gas deflector bag, to pass subsequently from the gas deflector bag through the ventilation holes in the gas deflector bag, into an interior of the main airbag, the first gas deflector panel defining first, second and third sides of the gas deflector bag, the first and third sides being generally parallel to one another upon inflation, the first and second sides being adjacent to one another and secured to a main airbag panel such that both the first and second sides are flush with the main airbag panel, the third side spaced from the main airbag panel.

18. The airbag arrangement according to claim 17, wherein the gas deflector further includes at least a second gas deflector panel secured to the first gas deflector panel and cooperating with the first gas deflector panel to define a cavity.

19. The airbag arrangement according to claim 18, wherein the first and the at least second gas deflector panels are U-shaped upon inflation.

* * * * *